United States Patent
Hackman et al.

(10) Patent No.: US 8,801,503 B2
(45) Date of Patent: Aug. 12, 2014

(54) GRINDING MACHINE WITH MULTI-SPINDLE GRINDING HEAD

(75) Inventors: Roger L. Hackman, Winnebago, IL (US); Wayne Martin, Roscoe, IL (US); Mark A. Ritchie, Machesney Park, IL (US)

(73) Assignee: Gleason Cutting Tools Corporation, Loves Park, IL (US)

( * ) Notice: Subject to any disclaimer, the term of this patent is extended or adjusted under 35 U.S.C. 154(b) by 245 days.

(21) Appl. No.: 13/526,756

(22) Filed: Jun. 19, 2012

(65) Prior Publication Data

US 2013/0337726 A1    Dec. 19, 2013

(51) Int. Cl.
 *B24B 53/00*    (2006.01)

(52) U.S. Cl.
 USPC ................. 451/48; 451/5; 451/65; 451/374; 451/443; 451/56

(58) Field of Classification Search
 CPC .. B24B 53/003; B24B 27/0061; B24B 33/04; B24B 7/228; B24B 9/10; B24B 19/022; B24B 3/021; B24B 3/26; B24B 15/06; B24B 7/06; B24B 7/14
 USPC ............. 451/5, 56, 443, 461, 547, 48, 65–73
 See application file for complete search history.

(56) References Cited

U.S. PATENT DOCUMENTS

| | | | |
|---|---|---|---|
| 1,906,845 A | | 5/1933 | Durkan |
| 2,231,762 A | * | 2/1941 | Johanson ....................... 451/120 |
| 2,410,348 A | * | 10/1946 | Johanson et al. ............... 451/48 |
| 2,437,850 A | * | 3/1948 | Dennis .......................... 451/362 |
| 2,748,540 A | * | 6/1956 | St George ..................... 451/220 |
| 2,749,685 A | * | 6/1956 | Baldwin ........................ 451/550 |
| 2,828,583 A | * | 4/1958 | Carlsen et al. .................. 451/48 |
| 3,027,688 A | * | 4/1962 | Zabransky ....................... 451/65 |
| 3,098,333 A | * | 7/1963 | Hannum ......................... 451/48 |
| 4,001,981 A | * | 1/1977 | Wood ............................. 451/548 |
| 4,144,678 A | * | 3/1979 | Ellwanger et al. .............. 451/48 |

(Continued)

FOREIGN PATENT DOCUMENTS

| | | |
|---|---|---|
| CH | 595946 A5 | 2/1978 |
| DE | 1502515 A1 | 2/1969 |

(Continued)

OTHER PUBLICATIONS

International Search Report and Written Opinion by ISA/EP for PCT/US2013/043567.

*Primary Examiner* — George Nguyen
(74) *Attorney, Agent, or Firm* — Robert L. McDowell

(57) ABSTRACT

A tool head for a machine tool comprising a plurality of tool spindles with each tool spindle being rotatable about a respective tool axis. The plurality of tool spindles comprises at least a first tool spindle rotatable about a first tool axis, a second tool spindle rotatable about a second tool axis and a third tool spindle being rotatable about a third tool axis with the first, second and third tool axes being parallel to one another. The first, second and third tool spindles are arranged on the tool head whereby one of the first, second and third tool spindles faces a first direction and the other two of the first, second and third tool spindles face a second direction with the first and second directions being 180 degrees apart. The tool spindles are preferably grinding spindles on a machine for grinding bevel gear cutting tools.

16 Claims, 8 Drawing Sheets

(56) References Cited

U.S. PATENT DOCUMENTS

| | | | |
|---|---|---|---|
| 4,170,091 A * | 10/1979 | Ellwanger et al. | 451/72 |
| 4,183,182 A * | 1/1980 | Kotthaus | 451/48 |
| 4,286,413 A * | 9/1981 | Axelsson et al. | 451/5 |
| 4,445,300 A * | 5/1984 | Sekiya et al. | 451/41 |
| 4,461,121 A * | 7/1984 | Motzer et al. | 451/5 |
| 4,661,064 A * | 4/1987 | Beltramini | 433/166 |
| 4,720,942 A * | 1/1988 | Miller | 451/547 |
| 4,834,655 A * | 5/1989 | Kyotani | 433/166 |
| 4,862,868 A * | 9/1989 | Dodd et al. | 125/11.03 |
| 5,168,661 A * | 12/1992 | Pedersen et al. | 451/5 |
| 5,503,588 A * | 4/1996 | Sweet | 451/5 |
| 5,547,417 A * | 8/1996 | Breivogel et al. | 451/58 |
| 5,823,857 A * | 10/1998 | Tan | 451/47 |
| 6,200,200 B1 * | 3/2001 | Himmelsbach | 451/62 |
| 6,283,837 B1 * | 9/2001 | Vorbuchner | 451/58 |
| 6,390,892 B1 * | 5/2002 | Klicpera | 451/47 |
| 8,506,358 B2 * | 8/2013 | Amarell et al. | 451/11 |
| 8,523,634 B2 * | 9/2013 | Woelfel | 451/47 |
| 2004/0209552 A1 * | 10/2004 | Kamamura et al. | 451/5 |
| 2005/0101229 A1 * | 5/2005 | Bauer et al. | 451/41 |
| 2005/0260926 A1 * | 11/2005 | Junker | 451/11 |
| 2005/0266774 A1 * | 12/2005 | Baldeck | 451/11 |
| 2008/0051013 A1 * | 2/2008 | Burgess | 451/51 |
| 2011/0312253 A1 * | 12/2011 | Shimizu et al. | 451/45 |
| 2013/0337726 A1 * | 12/2013 | Hackman et al. | 451/48 |

FOREIGN PATENT DOCUMENTS

| | | |
|---|---|---|
| DE | 3902612 A1 | 8/1989 |
| EP | 0501196 A1 | 9/1992 |
| EP | 1935564 A1 | 6/2008 |
| EP | 2366497 A1 | 9/2011 |
| GB | 2446036 A | 7/2008 |
| WO | 2004/080649 A1 | 9/2004 |
| WO | 2010/096765 A1 | 8/2010 |
| WO | 2011/038093 A1 | 3/2011 |
| WO | WO 2012164522 A1 * | 12/2012 |

* cited by examiner

GRINDING MACHINE WITH MULTI-SPINDLE GRINDING HEAD

FIELD OF THE INVENTION

The present invention is directed to grinding machines and in particular to multi-spindle grinding machines for grinding cutting tools.

BACKGROUND OF THE INVENTION

In the manufacture of bevel and hypoid gears it is known to utilize circular face mill type cutters, including form-relieved face mill cutters, having a plurality of cutting blades extending in an axial direction from one side of a cutter head. Each cutting blade includes a front face, top (or tip) surface, cutting (pressure) side surface, cutting edge, clearance side surface and a clearance edge. A protuberance surface may also be included usually near to the top surface. In form-relieved face mill cutters, the side surfaces and the top surface are helicoids. When the front face of a cutting blade is removed (e.g. ground) for sharpening purposes, the new front face profile has the same shape and radial position relative to the cutter axis as the prior profile, but is displaced axially toward the back (or bottom) surface of the cutter.

The cutting blades of a face mill cutter may be of the type known as outside cutting blades which cut the concave side of the teeth of a gear workpiece, or the cutting blades may be of the type known as inside cutting blades which cut the convex side of the teeth of a gear workpiece. Face mill cutters may also have alternatively arranged inside and outside cutting blades about the cutting tool. These alternating blade type of cutters form the entire tooth slot between adjacent teeth on a workpiece since each pair of inside and outside cutting blades forms the opposite sides of adjacent teeth. The cutting blades of a face mill cutter may be separate from the cutter head and attached thereto via means such as bolts, or the cutting tool may be of the type known as a "solid" cutter with cutting blades and cutter head formed integral with one another (i.e. one-piece) and produced from material such as hardened tool steel (e.g. APS 2030) or carbide (e.g. H10F).

In the grinding of tooth profiles of solid bevel gear form-relieved cutting tools a plurality of grinding wheels and/or a plurality of grinding machines have been used to complete the entire blade profile on both side surfaces, tip surface and the front cutting face. For example, the pressure (cutting) side surfaces and the clearance side surfaces may be ground with pencil-shaped tapered cone grinding wheels having relatively small diameters in comparison to length. However, due space limitation constraints dictated by things such as cutter diameter and blade-to-blade spacing, it is usually necessary for the diameter of a grinding wheel for grinding inner blade surfaces to be smaller than the diameter of a grinding wheel for grinding the outer surfaces of the cutting blades. Smaller diameter grinding wheels are necessary for inner blade surfaces so as to avoid interference with adjacent cutting blades that would occur if the larger diameter grinding wheel for outer surfaces were used for inner surface grinding. The smaller diameter grinding wheel may also be used for grinding the outer surfaces of the cutting blades but this generally results in a slower and less efficient process.

Additionally, the skilled artisan will understand that in order to maintain a certain desired grinding surface speed (e.g. 5,000-6,000 surface feet per minute (SFPM)), it is necessary to rotate the smaller diameter grinding wheel at a higher rate than the larger diameter outer surface grinding wheel. For example, a 0.3 inch diameter grinding wheel may be rotated at 72,000 revolutions per minute (RPM) while a grinding wheel with a diameter of 2.0 inches is rotated at 10,000 RPM in order to keep the grinding surface speed in the range of 5,000-6,000 SFPM.

For grinding the front cutting face, a flared cup-shaped grinding wheel with a flat grinding portion may be used to produce the compound face angle with offset rake and hook. Bevel gear solid cutters in the range from about 0.5-6.3 inches in point diameter limit the size of the flared cup-shaped grinding wheel for face sharpening by diameter interferences. The flared cup-shaped grinding wheels usually range from about 2.0 inches to about 7 inches diameter to eliminate interferences and maximize material removal rates. As the size of the flared cup-shaped grinding wheels increases the rotation speed decreases from about 16,000 revolutions per minute for the smallest diameter to about 3,000 revolutions per minute for the largest diameter to maintain a preferred wheel surface speed for face sharpening in the range of 3,000 to 4,000 surface feet per minute.

The top surface of the cutting blades may be ground by including an appropriately dressed shoulder portion formed on one or both of the inner or outer pencil-shaped tapered cone grinding wheels. However, the addition of this feature to the inner/outer grinding wheels further enhances the likelihood of interferences. Additionally, as the cutting blade size increases, the use of larger top flats and/or radii is predominate. In many cases, it is preferred to utilize a separate cup-shaped grinding wheel in order to provide an adequate top flat surface, tip chamfers, and faceted pre-contoured large tip radii.

While the utilization of separate grinding wheels for grinding different cutting blade surfaces overcomes the problem of interferences, a disadvantage is adding processing time with separate grinding operations. Some current tool manufacturing practices use the blending of profiles produced from multiple grinding wheels and wheel shapes to grind the tooth flanks, tooth tip radii, and tooth tip flat in multiple (e.g. up to five) setups. With CNC machine motion technology and rotary truing/dressing devices it is possible to contour the above mentioned pencil-shaped, flared or cup-shaped grinding wheels to incorporate multiple features, for example, the blade bottom radius/ramp, blade pressure angle flank, top rim, blade tip radius, and blade tip flat. In the example mentioned, the finish grinding process may be reduced to blending profiles of just two pencil-shaped grinding wheels. Probing of profiles, utilizing probes such as the Renishaw 3-D and with acoustical touch sensing, assists in the relative positioning of the grinding wheel to the inside and outside blade reference points and blending of profiles to achieve the required blade profiles, blade thickness, blade height, and bevel gear cutter point diameter.

Given the above, many tool manufacturing facilities employ a plurality of grinding machines dedicated to either pencil-shaped wheels, flared or cup-shaped wheels. A few incorporate a machine tool design to allow the exchange of spindle assemblies and drive mechanisms to accommodate the physical orientation for either pencil-shaped wheels, flared or cup-shaped wheels. Most require the use of dedicated machines with physical orientation as capable for only pencil-shaped wheel grinding, only flared wheel grinding or only cup-shaped wheel grinding. In most if not all cases, the cam relief motion on the machine tools use one axis to provide the radial motion to form the helicoidal surface (i.e. cam relief) which limits the machine's flexibility.

SUMMARY OF THE INVENTION

The invention comprises a tool head for a machine tool. The tool head comprises a plurality of tool spindles with each tool spindle being rotatable about a respective tool axis. The plurality of tool spindles comprises at least a first tool spindle rotatable about a first tool axis, a second tool spindle rotatable about a second tool axis and a third tool spindle being rotatable about a third tool axis with the first, second and third tool axes being parallel to one another. The first, second and third tool spindles are arranged on the tool head whereby one of the first, second and third tool spindles faces a first direction and the other two of the first, second and third tool spindles face a second direction with the first and second directions being 180 degrees apart.

The invention further comprises the tool head being positioned on a machine tool. The machine tool comprises a workpiece spindle rotatable about a work axis with the workpiece spindle and the tool head being movable relative to one another in up to three mutually perpendicular directions. The workpiece spindle is pivotable about a first pivot axis and the tool head is pivotable about a second pivot axis with the first pivot axis being perpendicular to the second pivot axis and the work axis being perpendicular to the first pivot axis.

DETAILED DESCRIPTION OF THE PREFERRED EMBODIMENT

Figure 1:
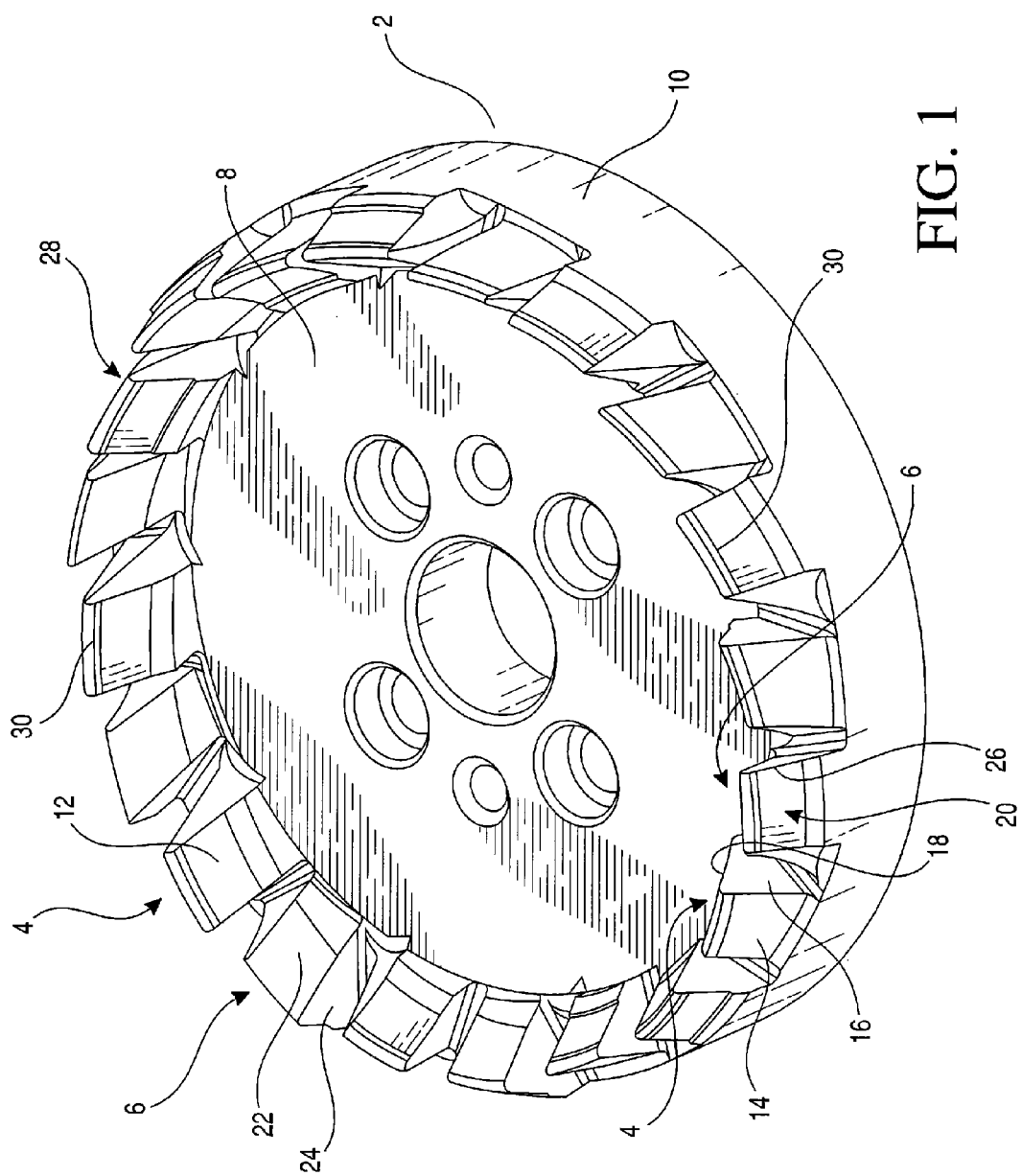
FIG. 1 illustrates an alternating blade solid cutter for bevel and hypoid gears.

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below.

The details of the invention will now be discussed with reference to the accompanying drawings which illustrate the invention by way of example only. In the drawings, similar features or components will be referred to by like reference numbers. For a better understanding of the invention and ease of viewing, doors and any internal or external guarding have been omitted from the drawings.

The use of "including", "having" and "comprising" and variations thereof herein is meant to encompass the items listed thereafter and equivalents thereof as well as additional items. Although references may be made below to directions such as upper, lower, upward, downward, rearward, bottom, top, front, rear, etc., in describing the drawings, the references are made relative to the drawings (as normally viewed) for convenience. These directions are not intended to be taken literally or limit the present invention in any form. In addition, terms such as "first", "second", "third", etc., are used to herein for purposes of description and are not intended to indicate or imply importance or significance.

In the present invention it is to be understood that the term "grinding cutting blades" is intended to include those grinding processes wherein a cutting blade blank is initially ground to produce desired surfaces (e.g. cutting side surface, clearance side surface, top surface, front cutting face, etc.) and edge conditions (e.g. cutting edge, clearance edge, etc.) thereon as well as those instances where existing cutting blade surfaces are ground to restore the desired surface geometry and edge conditions (i.e. sharpening). It should also be understood that the term "bevel" gears is intended to be of sufficient scope to include those types of gears known as bevel gears, "hypoid" gears, as well as those gears known as "crown" or "face" gears.

FIG. 1 shows an example of a known type alternating-blade solid face milling cutting tool 2 for cutting bevel gears. The circular tool 2 comprises alternating arranged inside cutting blades 4 and outside cutting blades 6 projecting axially from a front surface 8 of a cutter head base 10. Inside cutting blades 4 have a cutting (pressure) side surface 12 oriented at a predetermined pressure angle, a clearance side surface 14 oriented at a predetermined clearance angle, front cutting surface 16 oriented at a predetermined side rake angle and, if desired, inclined at a predetermined hook angle, and cutting edge 18 defined by the intersection of the cutting side surface 12 and the front cutting surface 16. Outside cutting blades 6 have a cutting (pressure) side surface 20 oriented at a predetermined pressure angle, a clearance side surface 22 oriented at a predetermined clearance angle, front cutting surface 24 oriented at a predetermined side rake angle and, if desired, inclined at a predetermined hook angle, and cutting edge 26 defined by the intersection of the cutting side surface 20 and the front cutting surface 24. Each cutting blade comprises a top surface 28 and an optional protuberance portion 30 is also included on the cutting side surface near to the top 28 on each cutting blade.

Figure 3:
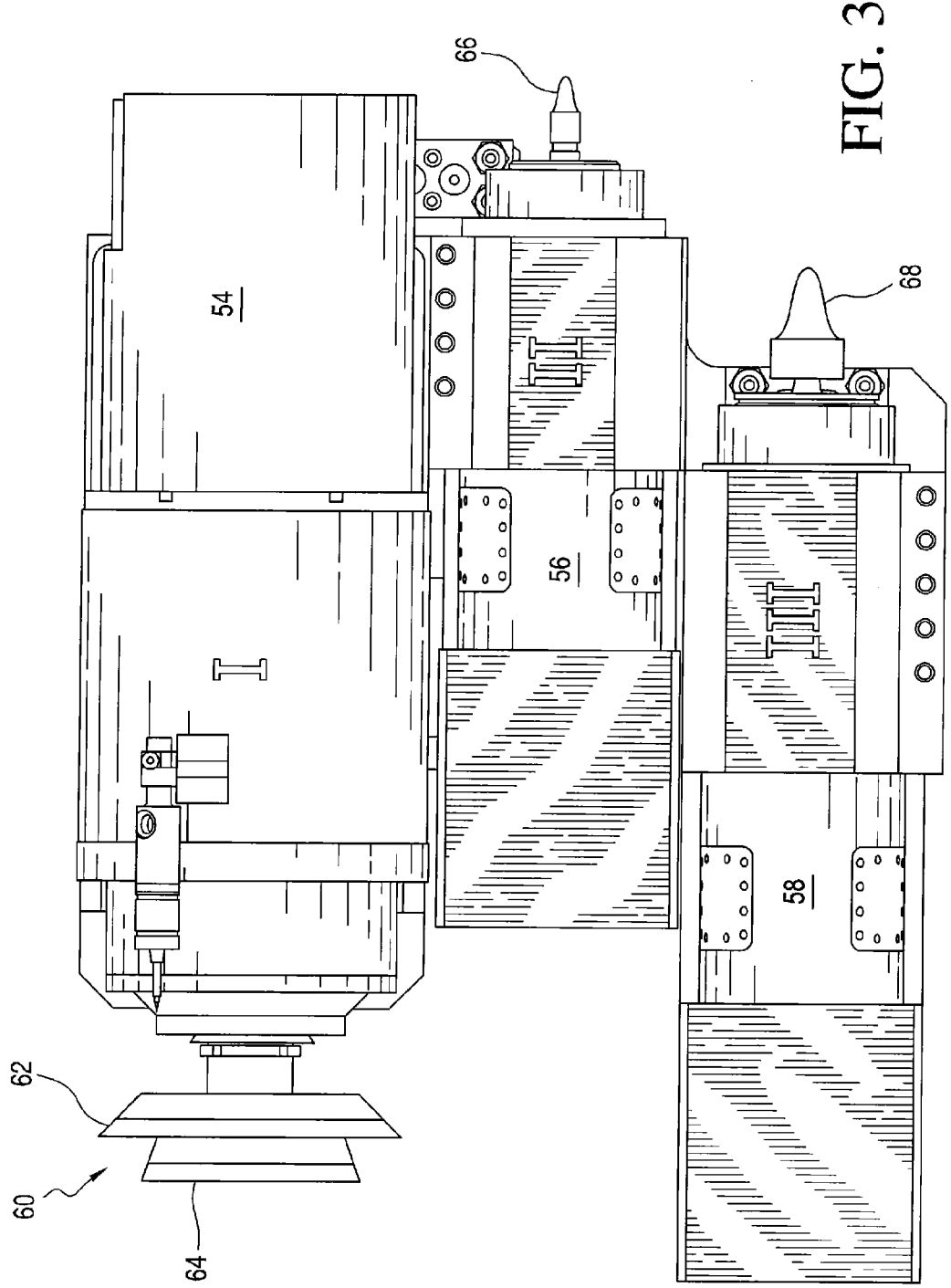
FIG. 3 is an elevated view of the preferred arrangement of the tool spindles of the present invention.
Figure 5:
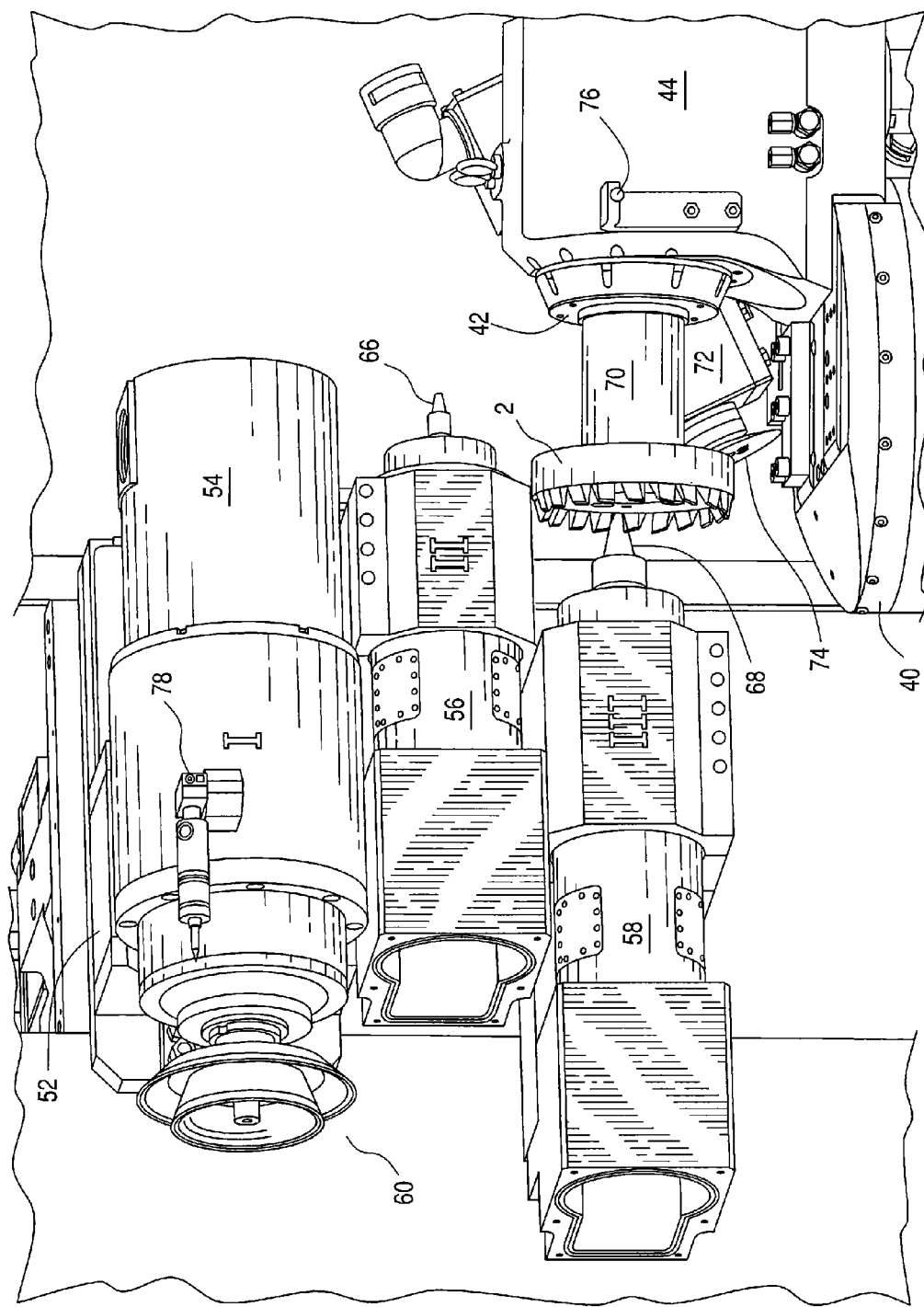
FIG. 5 shows grinding the outside surfaces of cutting blades on a bevel gear cutting tool.

The present invention is directed to a machine tool with six axis degrees of freedom having at least three variable speed grinding spindles mounted parallel to each other on an angularly adjustable grinding head (FIGS. 3 and 5). Preferably, each spindle has a unique speed range and is angularly positioned (swivel) thereby providing the flexibility to utilize cup-shaped (including flared cup-shaped) and pencil-shaped grinding wheels for grinding of relieved blade geometry and cutting face of bevel gear cutting tools without exchanging grinding wheels or spindle assemblies or modifying the machine construction to accommodate different types of grinding methods. It is preferable to employ at least three different high frequency variable speed spindles to cover the full range of spindle speeds (e.g. from 3,000 to 72,000 RPM) for profile grinding and cutter face sharpening.

Three spindles are preferred because of the difference in wheel diameters needed for grinding the cutting blade face and top, grinding inside blade profiles and grinding outside blade profiles. Grinding (including sharpening) is done with wheel diameters ranging from about 4.0 to 7.0 inches which is restricted by interferences of cutting blades located on the opposite side of cutter while sharpening. Grinding wheels for inside and outside blade profile grinding are also restricted by interferences with the tip and/or flank surfaces of adjacent teeth when the grinding wheel is fully engaged at the lowest cam relieved position (lowest point on the helicoidal surface)

on a blade profile. Inside blade cutting surface profile grinding generally has the greatest wheel diameter restriction (e.g. from about 0.25 to 0.75 inches) dependent on bevel cutter blade point radius to avoid touching an adjacent cutting blade. Outside blade cutting surface profile grinding allows for larger wheels than inside grinding without interferences with grinding wheel diameters being in the range of about 1.0 to 2.0 inches. In order to maintain preferred grinding wheel surface speeds in the range of about 5,000-6,000 SFPM for inside and outside surfaces and 3,000-4,000 SFPM for front cutting surfaces with grinding wheels ranging from 0.25 inches to 7.0 inches in diameter, a rotational speed range of about 3,000 to 72,000 RPM is contemplated. High frequency variable speed grinding spindles can only operate in a limited speed range with sufficient torque for grinding and therefore, three speed ranges are preferred to cover the entire range from 3,000 to 72,000 RPM.

Figure 2:
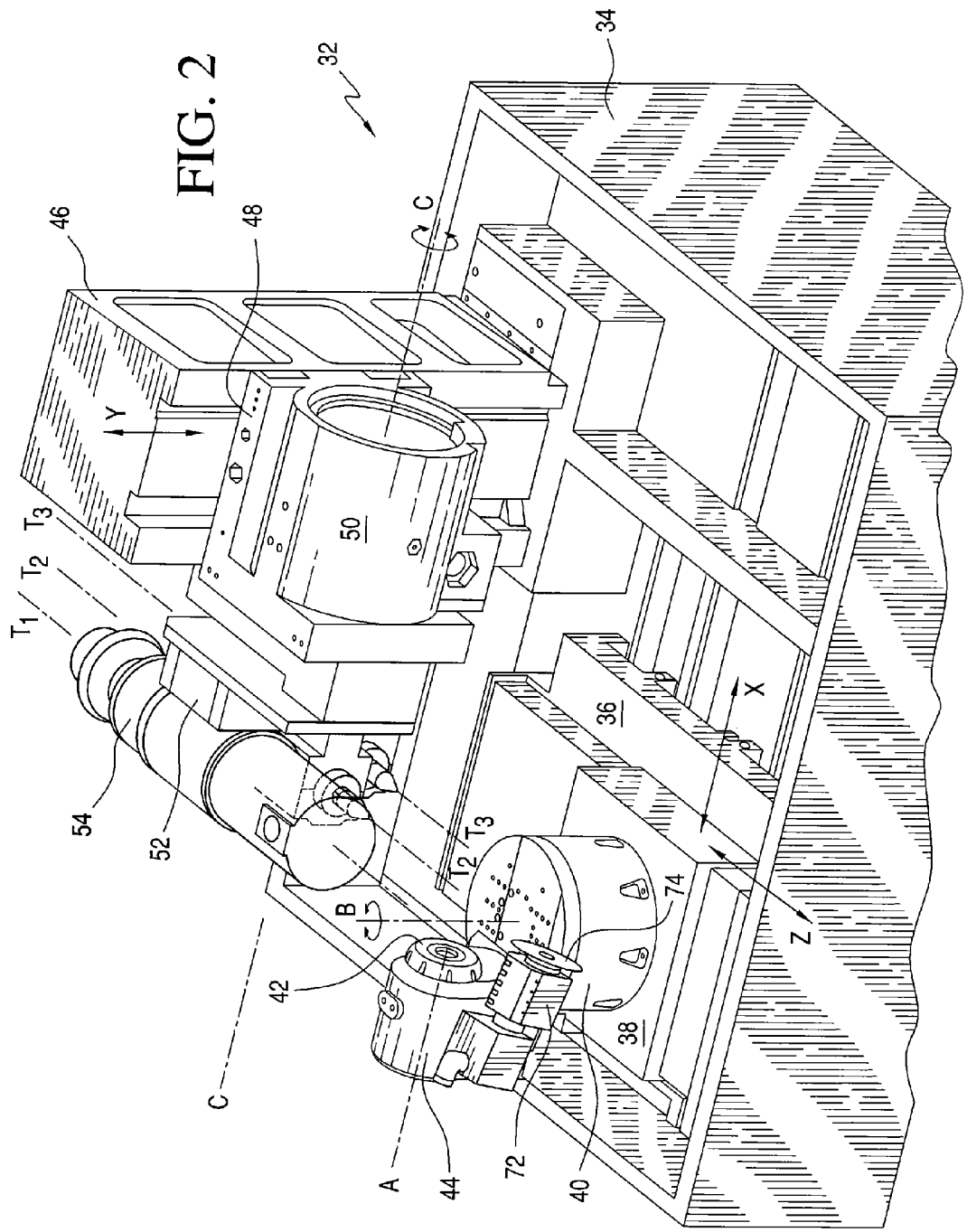
FIG. 2 is a perspective view of a grinding machine according to the present invention.

FIG. 2 shows a grinding machine 32 in accordance with the invention comprising a machine base 34, a longitudinal table 36 movable preferably via a truck and rail system (not shown) in direction X, a cross table 38 movable preferably via a truck and rail system (not shown) in direction Z, a workpiece turret 40 angularly adjustable about a pivot axis B, and a workpiece spindle 42 positioned on turret 40 via a spindle housing 44. Workpiece spindle 42 is rotatable about workpiece axis A.

Grinding machine 32 further comprises a tool column 46 on which a slide 48 is movable in a direction Y via a truck and rail system (not shown). Positioned on slide 48 is a motor 50 for the angular movement (pivoting) of tool head 52 about pivot axis C. At least three tool spindles 54, 56, 58 are positioned on tool head 52. Tool spindle 54 is rotatable about axis $T_1$, tool spindle 56 is rotatable about axis $T_2$ and tool spindle 58 is rotatable about axis $T_3$. Preferably, directions X, Y and Z are mutually perpendicular and pivot axes B and C are likewise preferably perpendicular to one another. Workpiece axis A is preferably perpendicular to pivot axis B. Tool axes $T_1$, $T_2$ and $T_3$ are preferably parallel to one another and perpendicular to axes C and A.

Movement of the longitudinal table 36 in direction X, cross table 38 in direction Z, workpiece turret 40 about axis B, workpiece spindle 42 about Axis A, slide 48 in direction Y, tool head 52 about axis C, tool spindle 54 about axis $T_1$, tool spindle 56 about axis $T_2$ and tool spindle 58 about axis $T_3$ is imparted by the separate drive motors (not shown) to move and position a tool (on any spindle) and a workpiece relative to one another. The above-named components are capable of independent movement with respect to one another or may move simultaneously with one another. Each of the respective motors is preferably associated a feedback device such as a linear or rotary encoder (not shown) as part of a CNC system which governs the operation of the drive motors in accordance with instructions input to a computer controller (i.e. CNC) such as the Fanuc model 310iA5.

FIG. 3 shows a preferred arrangement of three tool spindles 54, 56 and 58. Spindle 54 is a variable speed spindle capable of speeds in the preferred range of about 1,000-16,000 RPM. Spindle 54 is preferably utilized for grinding the front cutting face and/or the top surface of the cutting blades 4 and/or 6 of the cutting tool shown in FIG. 2. A nested grinding tool 60 is releasably mounted to spindle 54 for rotation about axis $T_1$ and comprises a flared cup-shaped grinding wheel 62 and cup-shaped grinding wheel 64. Grinding wheel 62 is utilized to grind the front cutting face of blades 4 and/or 6 and is oriented to produce the predetermined front side rake angle and/or the front hook angle on the face of each cutting blade. The cup-shaped grinding wheel 64 or alternate flat faced grinding wheel instead of wheel 64 is utilized for axial relief grinding the top of blades which top ground surface becomes the datum surface for positioning profiled wheels for grinding the inside and outside of cutting blades. The orientation of spindle 54 is preferably reversed by 180 degrees with respect to spindles 56, 58 in order to eliminate interference of the spindles 56, 58 with a bevel cutter during grinding with tool 60. Spindle 54 is also orientated in an opposite direction to minimize the vertical travel of the column slide 48 when the spindle housing assembly (i.e. tool head 52) is rotated from side profile grinding to face sharpening position.

Tool spindle 56 is a variable speed spindle capable of a preferred maximum speed of about 72,000 RPM. Tool spindle 56 is preferably utilized for grinding the inner surfaces of cutting blades including the cutting side surfaces 12 of inside cutting blades 4 (FIG. 2). Preferably, a pencil-shaped tapered cone grinding wheel 66 having a diameter in the preferred range of 0.25-0.75 inch is releasably mounted to spindle 56.

Tool spindle 58 is a variable speed spindle capable of a preferred maximum speed of about 42,000 RPM. Tool spindle 58 is preferably utilized for grinding the outer surfaces of cutting blades including the cutting side surfaces 20 of outside cutting blades 6 (FIG. 2). Preferably, a pencil-shaped tapered cone grinding wheel 68 having a diameter in the preferred range of 1.0-2.0 inch is releasably mounted to spindle 58.

Figure 4:
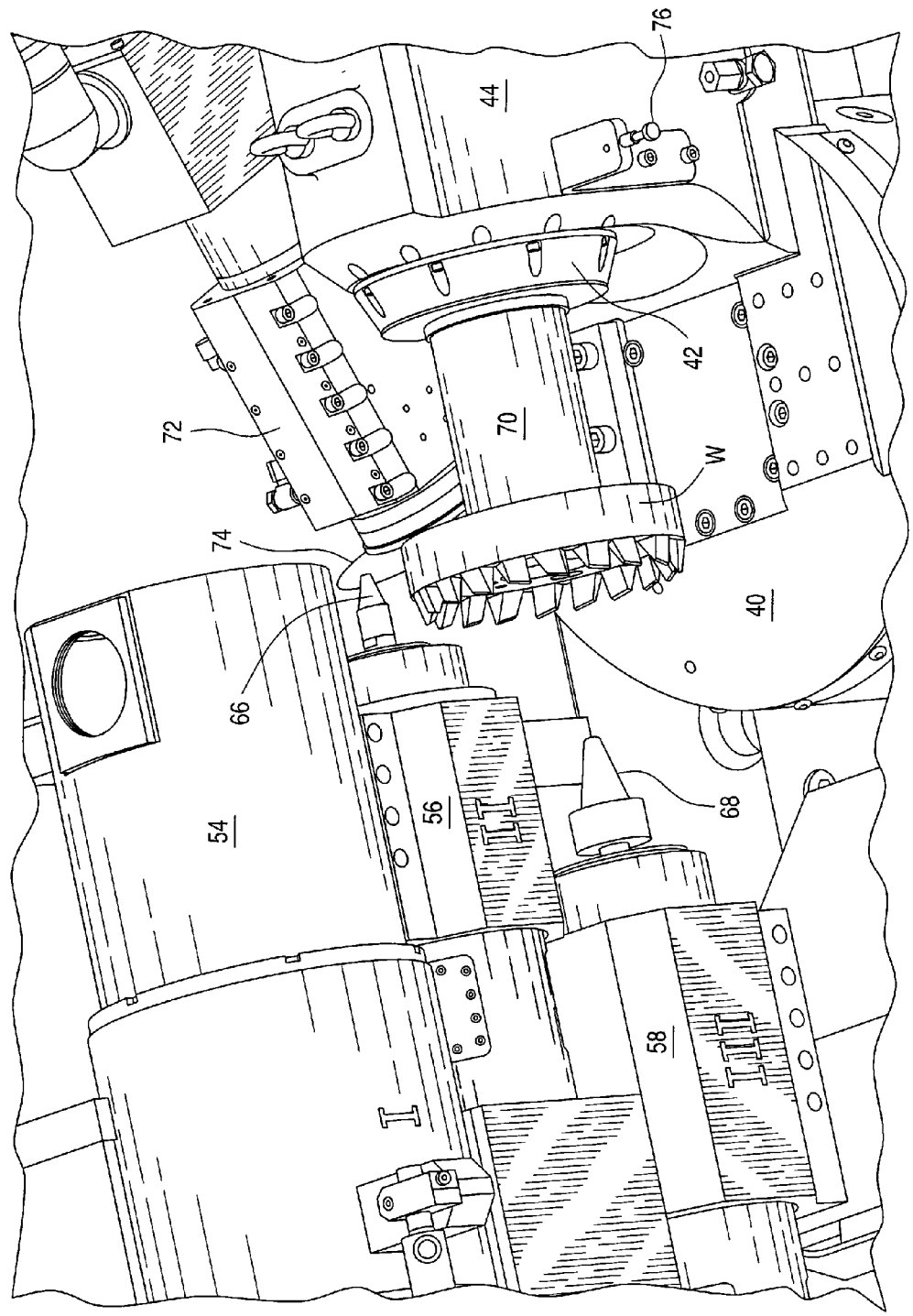
FIG. 4 illustrates dressing/truing of a grinding wheel.

FIG. 4 shows a workpiece W (e.g. a form-relieved solid alternating-blade face mill cutter 2 as shown in FIG. 1) secured to workpiece spindle 42 via suitable workholding equipment 70 as would be known to the artisan. Located adjacent to spindle housing 44 is a grinding wheel dressing/truing mechanism 72 to which a dressing/truing tool 74 is releasably attached and rotatable about a dresser axis. Tool spindle 56 is positioned such that grinding wheel 66 is being dressed by dressing/truing tool 74. Due to the offset arrangement of spindles 56 and 58, there is no interference between workpiece W and grinding wheel 68 during dressing of grinding wheel 66. A probe setup ball or block 76 is located on spindle housing 44 generally opposite to the dressing/truing mechanism 72. The setup ball or block 76 is utilized for referencing a touch probe mechanism 78 (FIG. 5, 7 or 8).

FIGS. 5-8 illustrate a sequence of grinding operations that may be performed for grinding the surfaces of cutting blades on a cutting tool such as the alternating-blade solid face mill cutter of FIG. 2. FIG. 5 shows grinding wheel 68 of spindle 58 engaging cutting tool 2 to grind the cutting side surfaces 20 of the outside cutting blades 6 as well as to grind the clearance side surfaces 14 of the inside cutting blades 4. It should be understood that clearance side surfaces may not need finish grinding subsequent to the initial grinding operation to produce them.

Figure 6:
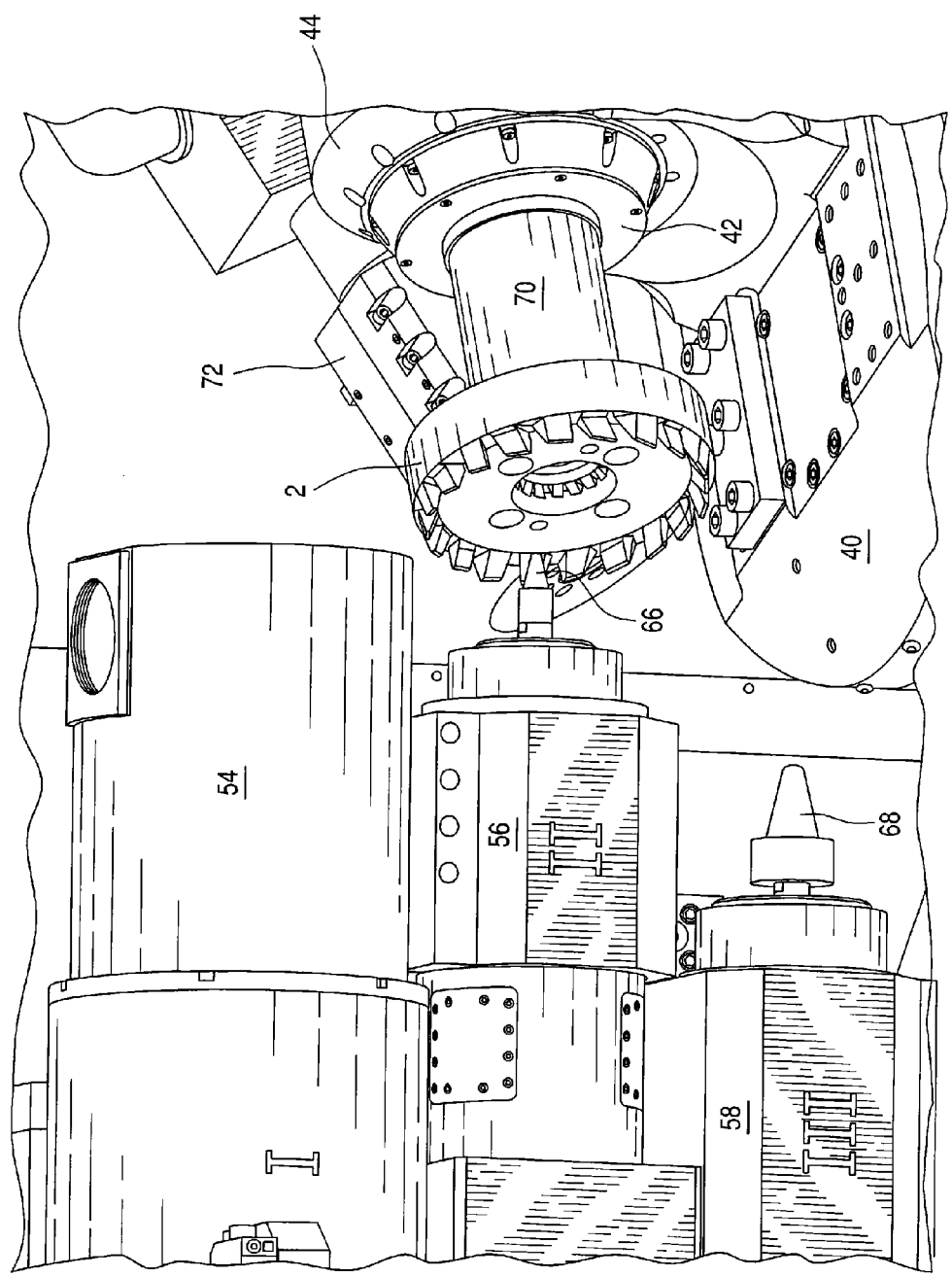
FIG. 6 shows grinding the inside surfaces of cutting blades on a bevel gear cutting tool.

FIG. 6 shows grinding wheel 66 of spindle 56 engaging workpiece 2 to grind the cutting side surfaces 12 of the inside cutting blades 4 as well as to grind the clearance side surfaces 22 of the outside cutting blades 6. It should be understood that clearance side surfaces may not need grinding subsequent to the initial grinding operation to produce them.

Figure 7:
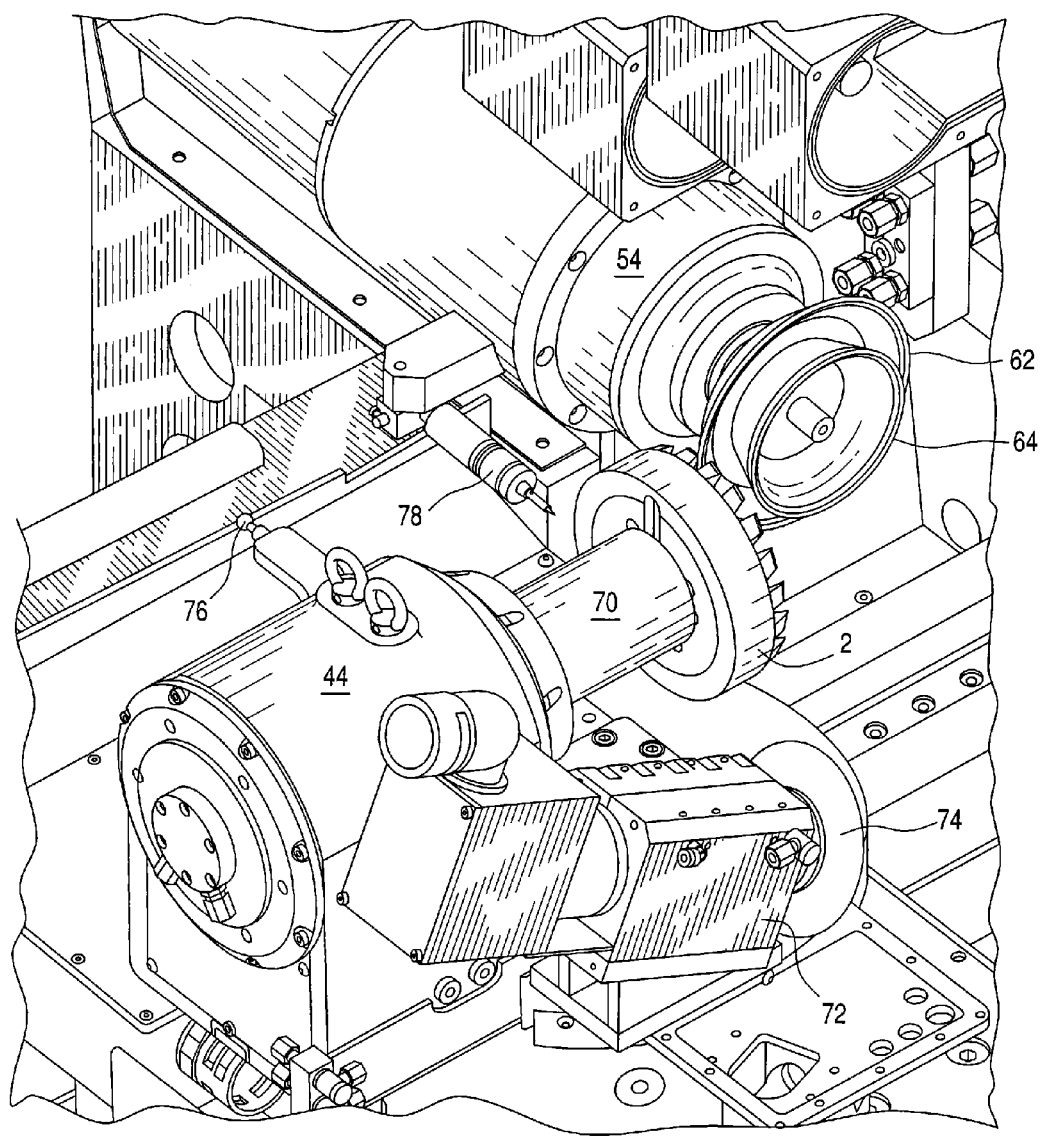
FIG. 7 illustrates grinding the front faces of the cutting blades on a bevel gear cutting tool.
Figure 8:
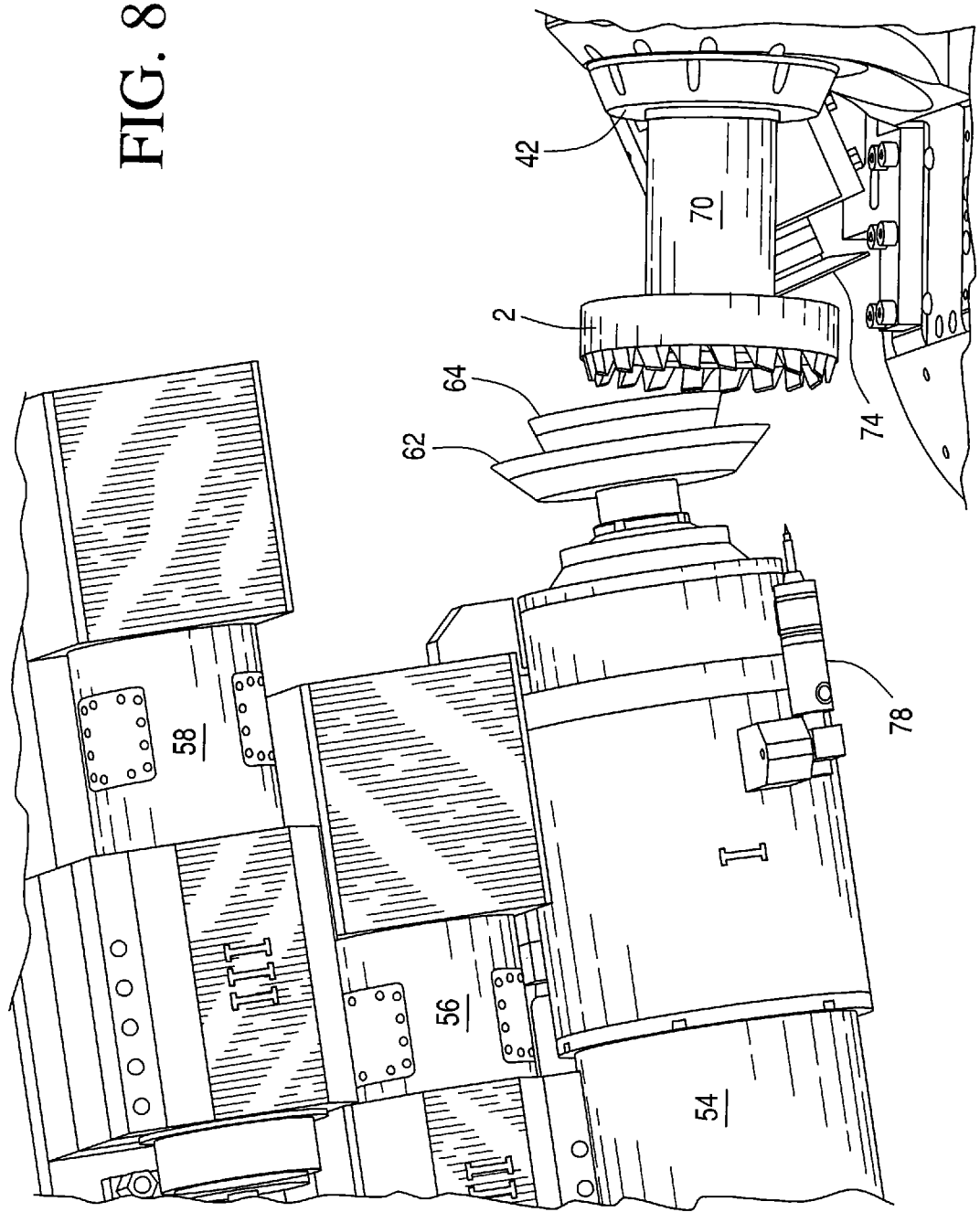
FIG. 8 illustrates grinding the top surfaces of the cutting blades on a bevel gear cutting tool.

FIG. 7 shows grinding of the front faces 16, 24 of the cutting blades 4, 6 utilizing the flared cup-shaped grinding wheel 62 located on spindle 54 which has been positioned by rotating tool head 52 approximately 180 degrees about axis C from the spindle positions shown in FIG. 5 or 6. All front faces may be ground serially or the front faces of all inside blades 4 may be ground followed by grinding the front faces of all outside blades 6.

FIG. 8 depicts grinding of the top surfaces 28 of cutting blades 4, 6 utilizing the cup-shaped grinding wheel 64 located on spindle 54.

While the invention has been illustrated and discussed with respect to form-relieved solid alternating-blade face mill cutters, the invention is not limited thereto. Other types of face milling cutters as well as face hobbing (continuous indexing) cutters, solid or attached-blade types, are contemplated for being ground on the inventive machine. Regardless of the type of bevel gear cutting tool, the present invention enables a plurality of cutting blade surfaces on one or more cutting blades to be ground by a plurality of tools in a single setup with no exchange of grinding wheels or tool spindles.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A tool head for a machine tool, said tool head comprising:
   a plurality of tool spindles with each tool spindle being rotatable about a respective tool axis;
   said plurality of tool spindles comprising at least a first tool spindle rotatable about a first tool axis, a second tool spindle rotatable about a second tool axis and a third tool spindle being rotatable about a third tool axis, said first, second and third tool spindle axes being parallel to one another wherein no more than one rotatable tool is releasably mountable to each of said first, second and third tool spindle;
   said first, second and third tool spindles being arranged on said tool head whereby one of said first, second and third tool spindles faces a first direction and the other two of said first, second and third tool spindles face a second direction with said first and second directions being 180 degrees apart, said other two of said first, second and third tool spindles being arranged side-by-side with one another and said one of said first, second, and third tool spindles being arranged outward of and adjacent to either of said other two spindles.

2. The tool head of claim 1 being positioned on a machine tool, said machine tool comprising:
   a workpiece spindle rotatable about a work axis;
   said workpiece spindle and said tool head being movable relative to one another in up to three mutually perpendicular directions;
   said workpiece spindle being pivotable about a first pivot axis and said tool head being pivotable about a second pivot axis with said first pivot axis being perpendicular to said second pivot axis and said work axis being perpendicular to said first pivot axis.

3. The tool head of claim 1 wherein said first, second and third tool spindles are each rotatable at variable speeds ranges.

4. The tool head of claim 3 wherein the variable speed range of the first, second and third tool spindles define a total speed range of 3,000 to 72,000 RPM.

5. The tool head of claim 1 wherein a nested grinding tool is releasably attached to at least one of said first, second and third tool spindles.

6. The tool head of claim 5 wherein said nested grinding tool comprises a flared cup-shaped grinding wheel and a cup-shaped grinding wheel.

7. The tool head of claim 1 wherein a pencil-shaped tapered cone grinding tool is releasably attached to at least one of said first, second and third tool spindles.

8. The tool head of claim 7 wherein a first pencil-shaped tapered cone grinding tool is releasably attached to one of said first, second and third tool spindles and a second pencil-shaped tapered cone grinding tool is releasably attached to another of said first, second and third tool spindles with said first pencil-shaped tapered cone grinding tool having a diameter less than the diameter of said second pencil-shaped tapered cone grinding tool.

9. The tool head of claim 1 wherein said other two of said first, second and third tool spindles are adjacent to one another.

10. A method of grinding a plurality of surfaces on one or more cutting blades of a gear cutting tool, said method comprising:
   providing a multi-axis grinding machine having a tool head comprising a plurality of tool spindles with each tool spindle being rotatable about a respective tool axis; said plurality of tool spindles comprises at least a first tool spindle rotatable about a first tool axis, a second tool spindle rotatable about a second tool axis and a third tool spindle being rotatable about a third tool axis, said first, second and third tool axes being parallel to one another; said first, second and third tool spindles being arranged on said tool head whereby one of said first, second and third tool spindles faces a first direction and the other two of said first, second and third tool spindles face a second direction with said first and second directions being 180 degrees apart;
   providing at least one grinding wheel on each of said first, second and third tool spindles;
   positioning the at least one grinding wheel on one of said first, second or third tool spindle proximate to said workpiece;
   moving said workpiece and said tool head relative to one another to grind a first surface on said one or more cutting blades;
   positioning the at least one grinding wheel on another of said first, second or third tool spindle proximate to said workpiece;
   moving said workpiece and said tool head relative to one another to grind a second surface on said one or more cutting blades;
   positioning the at least one grinding wheel on the remaining one of said first, second or third tool spindle proximate to said workpiece;
   moving said workpiece and said tool head relative to one another to grind a third surface on said one or more cutting blades;
   whereby grinding of said first, second and third surfaces is accomplished in a single machine set-up with no exchange of grinding wheels or tool spindles.

11. The method of claim 10 further comprising grinding a fourth surface on said one or more cutting blades with said at least one grinding wheel on one of said first, second and third tool spindles.

12. The method of claim 10 wherein said gear cutting tool is a solid face milling gear cutting tool.

13. The method of claim 12 wherein said solid face milling gear cutting tool includes alternating arranged inside cutting blades and outside cutting blades.

14. The method of claim 10 wherein said at least one grinding wheel on one of said first, second and third tool spindles comprises nested grinding wheels.

15. The method of claim 10 wherein said at least one grinding wheel on one of said first, second and third tool spindles comprises a pencil-shaped tapered cone grinding tool.

16. The method of claim 10 wherein the variable speed range of the first, second and third tool spindles define a total speed range of 3,000 to 72,000 RPM.

* * * * *